June 29, 1926.
E. FILLETTAZ
1,590,817
APPARATUS FOR INDICATING CHANGES OF DIRECTION FOR ROAD VEHICLES
Filed Nov. 17, 1923
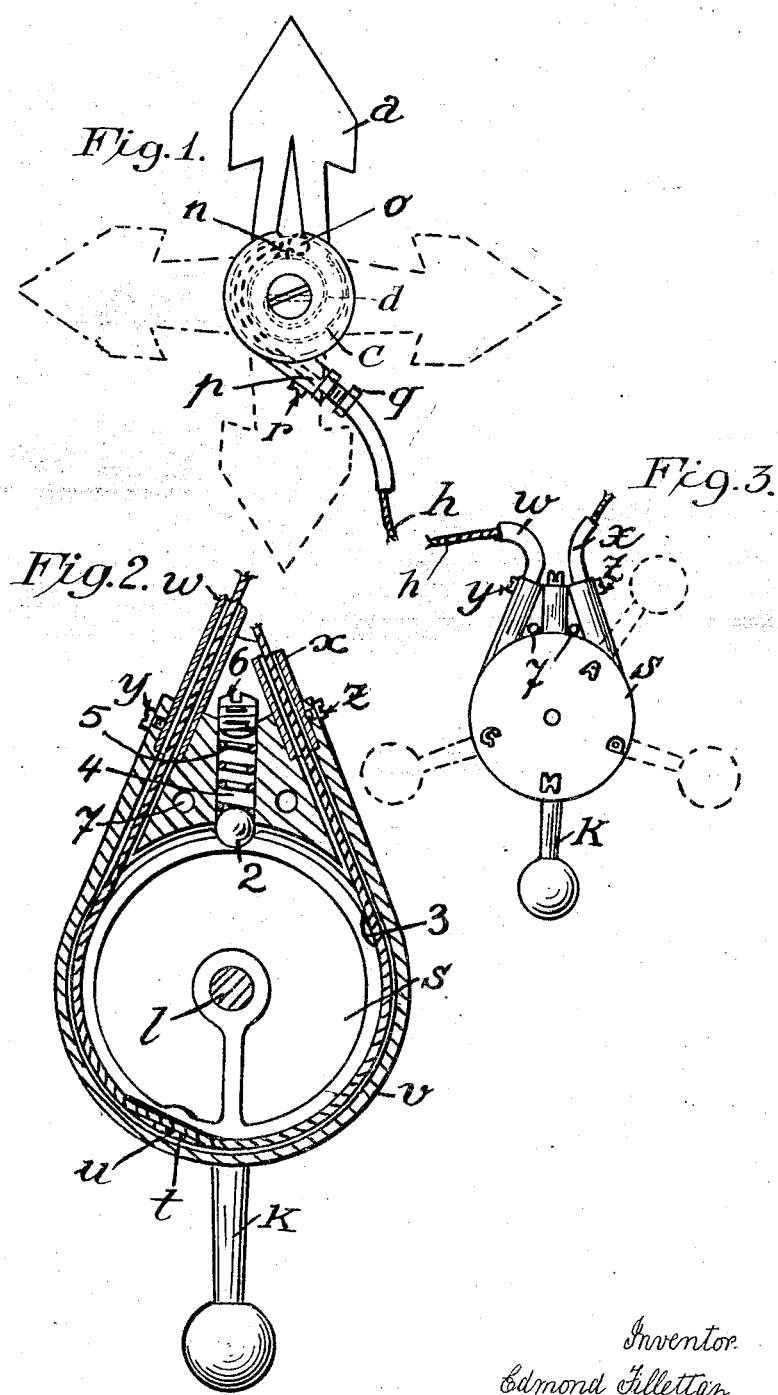
Inventor
Edmond Fillettaz
Attorney Percy Haddan Patented June 29, 1926.

1,590,817

UNITED STATES PATENT OFFICE.

EDMOND FILLETTAZ, OF GENEVA, SWITZERLAND.

APPARATUS FOR INDICATING CHANGES OF DIRECTION FOR ROAD VEHICLES.

Application filed November 17, 1923, Serial No. 675,391, and in Switzerland November 27, 1922.

This invention relates to improvements in apparatus for actuating a pointer or pointers of the type adapted to be mounted on a motor car or other road vehicle and capable of being brought into various positions by mechanical actuating means for signalling the intended direction of the vehicle.

The annexed drawings illustrate my improved construction of actuating apparatus for such signalling pointers.

Fig. 1 is an elevation, showing the means connecting the apparatus to the pointer.

Fig. 2 is a view drawn to a larger scale of the operating handle, the cover of which is shown removed.

Fig. 3 is an elevation of the operating handle and its casing.

$a$ illustrates the pointer of arrow shape. The pointer $a$ is mounted on a drum $c$ containing a spiral spring. The drum $c$ with the pointer $a$ is arranged on a suitable part of the vehicle, on the side of the windscreen, for instance, and a second similar pointer arranged on the back part of the vehicle. The drum $c$ is mounted on an axle on which it can revolve against the action of its spring.

The spring $d$ contained in the drums $c$ is spiral. One of the ends of the said spring is secured on the drum axle, the other end being secured to the drum. The drum is provided inside with a hook $n$ to which one end of the transmission cable $h$ is attached by means of a metal ball $o$ soldered on one end of the cable and which is engaged in the hook $n$. The other end of the cable is connected in a similar manner to the drum of the second pointer (not illustrated). The drum is provided with a short tube $p$ through which the cable passes and on which is a nut $q$ which engages the covering of the cable, which covering is fixed by the grub screw $r$. The flexible cable passes round a grooved pulley $s$ of the operating device, said pulley having at a point of its circumference a channel $t$, in which the cable passes and the cover of which is gripped therein by a screw $u$. The pulley $s$ which is provided with a handle $k$ is rotatably mounted on an axle $l$ arranged in a casing $v$ enclosing the pulley and provided with tubes $w$ and $x$ for the entrance and exit of the cable. Screws $y$ and $z$ secure the cover of the cable in the tubes $w$ and $x$. The casing is provided with means for arresting the pulley in the various positions corresponding with the different positions of the pointers, said means comprising a ball 2 and notches 3 formed on the pulley. The ball 2 is arranged in a housing 4 formed in the casing $v$ and is subjected to the pressure of a spring 5 the tension of which is regulated by a screw 6, screwed into the top of the housing 4.

The casing $v$ is provided with holes 7 for screws for fixing it to the vehicle within reach of the driver.

The four positions of the pointer are shown in Fig. 1, that in solid lines being the position during normal running of the vehicle and the positions shown in dotted lines being the right and left turning positions and the downward or "stop" positions respectively.

The casing is provided with marks such as M, G, D, A, each corresponding to one of the above described positions of the pointer, and the driver moves the lever $k$ to the one or other mark whereby the pointer is shifted by means of the cable so as to point in the required direction for the given indication.

What I claim as my invention and desire to secure by Letters Patent of the United States is:—

Apparatus for actuating a signal for road vehicles comprising a cable, means for detachably connecting one end of the cable to the signal, a casing, a pulley rotatably mounted in said casing and having a peripheral groove and recesses formed in its periphery at determined intervals, a lever attached to said pulley and extending through said casing for imparting a movement of rotation to said pulley, a ball mounted in said casing and adapted to engage in any one of said recesses, a spring bearing on said ball, and means for connecting said cable to the periphery of said pulley so as to lie in said groove thereof.

In witness whereof I have signed this specification.

EDMOND FILLETTAZ.